United States Patent [19]

Boileau et al.

[11] 4,381,385

[45] Apr. 26, 1983

[54] PROCESS FOR THE PREPARATION OF POLYMERS AND COPOLYMERS BASED ON VINYL CHLOROFORMATE

[75] Inventors: Sylvie L. Boileau, Paris; Gilles F. Meunier, Boulogne Billancourt; Sabine M. Journeau, Arpajon, all of France

[73] Assignee: Societe Nationale des Poudres et Explosifs, Paris, France

[21] Appl. No.: 227,483

[22] Filed: Jan. 22, 1981

[30] Foreign Application Priority Data

Feb. 7, 1980 [FR] France .................................. 80 02651

[51] Int. Cl.$^3$ .............................................. C08F 18/00
[52] U.S. Cl. .............................. 526/230.5; 526/292.1; 526/292.6; 526/292.7
[58] Field of Search .................... 526/230.5, 291, 292.1, 526/292.6, 292.7

[56] References Cited

U.S. PATENT DOCUMENTS

| | | | |
|---|---|---|---|
| 2,370,588 | 2/1945 | Strain | 260/453 |
| 2,377,085 | 5/1945 | Küng | 260/463 |
| 2,476,637 | 7/1949 | Strain et al. | 260/463 |
| 3,022,281 | 2/1962 | Smith | 526/230.5 |
| 3,051,686 | 8/1962 | Bissinger | 526/292.7 |
| 3,118,862 | 1/1964 | Schaefgen | 526/291 |
| 3,432,484 | 3/1969 | Welch | 526/230.5 |
| 3,528,956 | 9/1970 | Gerritsen et al. | 526/230.5 |
| 3,547,860 | 12/1970 | Roh | 526/230.5 |
| 3,821,273 | 6/1974 | D'Angelo | 526/230.5 |

OTHER PUBLICATIONS

J. R. Schaefgen, Journal of Polymer Science, Part C, No. 24, pp. 75–88, (1968).

*Primary Examiner*—Harry Wong, Jr.
*Attorney, Agent, or Firm*—Bucknam and Archer

[57] ABSTRACT

The invention relates to a process for the synthesis of polymers from vinyl chloroformate. The reaction is preferably carried out at between 15° and 40° C., in the presence of 0.01 to 2 mol % of a cycloaliphatic percarbonate, relative to the vinyl chloroformate. The resulting homopolymers and copolymers are useful, in particular, as transparent materials and reactive support polymers which can be used in the pharmaceutical, photographic or foodstuffs industry and also in the manufacture of dyestuffs.

14 Claims, No Drawings

PROCESS FOR THE PREPARATION OF POLYMERS AND COPOLYMERS BASED ON VINYL CHLOROFORMATE

The present invention relates to a process for the synthesis of polymers and copolymers based on vinyl chloroformate.

Vinyl chloroformate homopolymer and copolymers based on vinyl chloroformate have not been studied in great detail hitherto. The reason for this is two-fold. Firstly, until the appearance of French Pat. No. 2,381,739 of the applicant company, there were no known processes for the industrial manufacture of vinyl chloroformate other than the pyrolysis of ethylene glycol bis-chloroformate, which has a poor yield and gives a large number of by-products. Secondly, there were no known conditions making it possible to obtain a homopolymer or copolymers of high molecular weight and good stability.

Thus, Schaefgen, in U.S. Pat. No. 3,118,862 and in Journal of Polymer Science, Part C, No. 24, pages 75–88, (1968), attempted to polymerise and copolymerise vinyl chloroformate by a free-radical method, using very diverse initiators.

The said author reports the setbacks which are experienced when using an azo derivative, such as azo-bis-isovaleronitrile, a peroxide, such as benzoyl peroxide, or ultraviolet radiation in association with benzoin monomethyl ether. On the other hand, he recommends the use of trialkylboranes, such as triethylborane or tributylborane, in the presence of a small amount of air. He also recommends nitrogen difluoride, $N_2F_2$. However, although these initiators make it possible effectively to obtain appreciable molecular weights and only slightly degraded polymers, they have two serious disadvantages, namely their marginal economics and their conditions of use.

In fact, trialkylboranes must be used at between 0° and −80° C., whilst $N_2F_2$, at ambient temperature, is difficult to handle on account of its tendency to decompose with the liberation of fluorine gas.

A process for the polymerisation of vinyl chloroformate has now been found which leads to high molecular weights, uses mild conditions and ensures a high degree of safety.

The process for the polymerisation of vinyl chloroformate according to the invention is characterised in that an aliphatic or cycloaliphatic percarbonate is used as the initiator.

A preferred embodiment of the process according to the invention uses a percarbonate of the general formula:

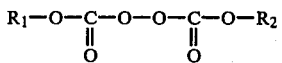

in which $R_1$ and $R_2$ are different or, preferably, identical and are a linear or branched alkyl group containing from 3 to 8 carbon atoms or alternatively a cyclohexyl group optionally substituted by one or two linear or branched alkyl groups containing from 1 to 4 carbon atoms.

A particularly preferred embodiment uses a dicyclohexyl percarbonate optionally substituted by one or two linear or branched alkyl groups containing from 1 to 4 carbon atoms. Two particularly suitable percarbonates are dicyclohexyl percarbonate and bis-(4-t-butylcyclohexyl) percarbonate.

According to another preferred embodiment, the polymerisation is carried out at a temperature between 0° and 50° C. and preferably between 15° and 40° C.

According to yet another preferred embodiment, from 0.01 to 2 mol%, preferably from 0.04 to 1 mol%, of initiator is used, relative to the monomer.

The reaction is carried out under these conditions for a generally short period of the order of 10 minutes to 3 hours. The reaction can be carried out either in bulk or in solution. In the latter case, an inert solvent which dissolves the polymer and does not contain peroxides, such as a chlorinated aliphatic hydrocarbon, an ether from which peroxide has been removed, or a ketone, is used. Thus, methylene chloride, dioxane or acetone may be mentioned as the solvent. If the reaction is carried out in solution, it is generally necessary to use more initiator than if the reaction is carried out in bulk.

Hitherto, there were no known means for polymerising vinyl chloroformate in solution, this being a much more difficult operation than polymerisation in bulk. Within the scope of the process according to the invention, it is advantageous to use an inert atmosphere, namely an inert gas, such as nitrogen or argon, or a vacuum, which generally gives better results.

Diisopropyl, di-n-butyl, di-sec.-butyl, di-t-butyl and bis-(2-ethylhexyl) percarbonates may be mentioned as aliphatic percarbonates which can be used within the scope of the invention. Dicyclohexyl percarbonate and bis-(4-t-butylcyclohexyl) percarbonate may be mentioned as cycloaliphatic percarbonates which are preferably used according to the invention. The cycloaliphatic percarbonates are preferred to the aliphatic percarbonates because the latter, under the conditions of the vinyl chloroformate reaction, have a tendency to decompose prematurely, which can prove troublesome in use. In fact, slightly coloured polymers are generally obtained in the case of the aliphatic percarbonates.

The process according to the invention applies not only to the homopolymerisation of vinyl chloroformate but also to its copolymerisation with vinylic monomers which can undergo free-radical polymerisation, in particular those having a reactivity, at 40° C., which is at least equal to that of vinyl acetate. Monomers of this type which may be mentioned are acrylonitrile, methyl methacrylate, styrene, vinyl chloride and, of course, vinyl acetate.

It is with monomers of this type that the invention is particularly advantageous because, despite the significant progress recently made in respect of the price of vinyl chloroformate, the aim on the whole is to synthesize copolymers with a low chloroformate content. It is well known to those skilled in the art of free-radical copolymerisation that it is possible to adjust the final composition of a copolymer with the aid of essentially three parameters, namely the relative reactivity of the monomers, their initial proportion and the reaction time. However, all this is only possible if there is a means available for catalysing the reaction of the key monomer sufficiently well. It must be noted that, in the present case, the initiators recommended by Schaefgen did not make it possible, according to his work, to control the reaction well, since attempts to copolymerise vinyl acetate and vinyl chloroformate gave, for example, mixtures of vinyl acetate homopolymers and vinyl acetate/vinyl chloroformate copolymers with a poorly controlled and very high content of the latter monomer.

It is therefore a significant advantage of the invention to have provided a means which makes it possible to treat vinyl chloroformate in the same way as the more widespread and better-known vinylic monomers. To illustrate how the composition of the copolymers based on vinyl chloroformate can be controlled, it is necessary to draw a distinction between the more reactive or equally reactive comonomers (as regards polymerisation) and the less reactive comonomers. In the case of the latter, they will have to be used in large excess relative to the vinyl chloroformate (the excess being the larger, the greater the reactivity difference), and the reaction will have to be extended for a relatively long time. In the case of a more reactive comonomer, if it is also desired to obtain a copolymer with a relatively low chloroformate content, it is advantageous to employ the said comonomer in a proportion which is the lower, the greater is the reactivity difference between this comonomer and the vinyl chloroformate, and it is preferable to stop the reaction relatively early; otherwise, despite the spontaneous chain-termination reactions, there is a risk of obtaining a copolymer having a very high molecular weight and an excessively low chloroformate content; in other words, the copolymerisation reaction should be ended when all the vinyl chloroformate has reacted, and the excess comonomer which may remain should be removed. The amount of comonomer removed in this way approximately corresponds to the amount of comonomer to be withdrawn from the initial charge of a following operation aimed at achieving the same result. As regards the reactivity ratios of pairs of monomers, they can be determined very satisfactorily by applying the graphical evaluation method proposed by Kelen and Tüdos in J. Macromol. Sci. Chem., A9, 1 (1975), and by Kelen et al., op.cit., A 10, 1,513 (1976).

Although it has been explained that it is not necessarily desired to obtain good yields, in particular in copolymerisation, the general yield of the polymerisation reaction is usually between 60 and 100% after 3 hours.

The molecular weights achieved in homopolymerisation by virtue of the process according to the invention are generally between 14,000 and 100,000.

The invention also relates, by way of new products, to vinyl chloroformate polymers having a number-average molecular weight of between 60,000 and 100,000, vinyl acetate/vinyl chloroformate copolymers having a number-average molecular weight of between 8,000 and 50,000 and containing from 0.5 to 50% of chloroformate groups and 50 to 99.5% of acetate groups, styrene/vinyl chloroformate copolymers having a molecular weight of between 8,000 and 50,000 and containing from 1 to 10% of chloroformate groups, and also vinyl chloride/vinyl chloroformate copolymers having a molecular weight of between 8,000 and 100,000 and containing from 0.5 to 30% of chloroformate groups.

These molecular weights can be determined from those of the polymer obtained after neutralisation of the chloroformate groups, for example with an amine.

The homopolymers and copolymers obtained by the process according to the invention are useful, in particular, as transparent materials and also as reactive support polymers for the pharmaceutical, photographic, foodstuffs or dyestuffs industry.

The invention is illustrated by the following non-limiting examples.

EXAMPLE 1

54 mmols of vinyl chloroformate were polymerised with the aid of 0.027 mmol of dicyclohexyl percarbonate (DHPC), at 40° C. and in bulk. The molar ratio initiator/monomer was equal to 0.05%. After 100 minutes, the resulting polymer was dissolved in tetrahydrofuran and it was reprecipitated, in the form of a white powder, in petroleum ether.

A yield of 55% was obtained. The polymer was identified by its infra-red spectrum and its molecular weight was determined by deduction from the molecular weight, obtained by osmometry, of the polymer modified by excess N-benzyl-methylamine. The molecular weight of the poly-(vinyl chloroformate) was 14,500.

The polymerisation was carried out under nitrogen. The initiator had been dried to constant weight beforehand and the monomer had been degassed three times in vacuo.

EXAMPLE 2

Under the same reaction conditions and separation conditions as in the previous example, 0.185 mol of vinyl chloroformate was polymerised, this time using 0.0185 mmol of DHPC, that is to say an initiator/monomer ratio of 0.1 mol%.

The reaction was ended after only 8 minutes, the yield being above 90%.

The molecular weight $\overline{M}_n$ of the poly-(vinyl chloroformate) thus obtained was 47,500. This molecular weight was determined as in Example 1.

EXAMPLES 3 TO 5

The initiating capability of the dicyclohexyl percarbonate (DHPC) according to the invention was compared with that of two industrial initiators, namely benzoyl peroxide (BP) and azo-bis-isobutyronitrile (AIBN).

All the reactions were carried out under nitrogen, on the same batch of monomer and with the same initiator/monomer ratio of 0.5%.

| Example | Initiator | VCF[a] (in mmols) | Initiator (in mmols) | T[b] (°C.) | t (in hours) | $\overline{M}_n$ | Yield (in %) |
|---|---|---|---|---|---|---|---|
| 3 | DHPC | 58 | 0.28 | 35 | 1.5 | 60,000 | 83 |
| 4 | BP | 74 | 0.37 | 54 | 15 | 39,000 | 92 |
| 5 | AIBN | 81 | 0.4 | 56 | 17 | 58,500 | 98 |

[a]VCF: vinyl chloroformate
[b]Polymerisation temperature.

In these comparison experiments, the polymer obtained was colourless in the case of DHPC, whereas it was brown-coloured in the case of BP and AIBN.

It will be clearly noted that the initiator according to the invention makes it possible to obtain a higher molecular weight than the previously known initiators, and to do this in a tenth of the time, at a temperature which is 20° C. lower. All the molecular weights were determined from those of the polymer modified by N-benzyl-methylamine.

EXAMPLE 6

219 mmols of vinyl chloroformate were polymerised with the aid of 1.1 mmols of DHPC, at 35° C. This time, the reaction was carried out in vacuo. The initiator/monomer ratio was 0.5%.

A colourless poly-(vinyl chloroformate) having a molecular weight $\overline{M}n=68,000$ was obtained with a yield of more than 90% and after only 47 minutes.

EXAMPLE 7

61 mmols of vinyl chloroformate were polymerised with the aid of 0.3 mmol of bis-(4-t-butylcyclohexyl) percarbonate. The initiator/monomer ratio was equal to 0.5%. The polymerisation was carried out in vacuo at 35° C.

After only 40 minutes, perfectly colourless poly-(vinyl chloroformate) having a molecular weight $\overline{M}n=72,000$ was obtained with a yield of 98%.

EXAMPLE 8

Vinyl chloroformate was polymerised in solution; as far as is known, this had never been done previously. For this purpose, 49 mmols of vinyl chloroformate were polymerised in solution in 13.8 ml of methylene chloride, in the presence of 0.24 mmol of DHPC.

The polymerisation temperature was 35° C.

After 20 hours, a colourless poly-(vinyl chloroformate) having a molecular weight $\overline{M}n=22,000$ was obtained with a yield of 93%.

EXAMPLE 9

Under the same conditions as above, with 142 mmols of monomer in 40 ml of methylene chloride and with a DHPC/monomer ratio of 1.5 mol%, a yield of 100% of colourless poly-(vinyl chloroformate) was obtained, again at 35° C., after 27 hours.

From an industrial point of view, it is extremely advantageous to be able to carry out the reaction in solution. In fact, the reaction is controlled more easily and the desired molecular weight can be achieved with high precision. It will also be noted that it is a very easy and energy-saving operation to maintain a temperature of 35° C.

In Examples 8 and 9, the polymers were collected by precipitating the reaction medium in petroleum ether. The experiments in these examples were carried out in vacuo.

EXAMPLE 10

Schaefgen (op.cit., page 84) described a vinyl acetate/vinyl chloroformate copolymer containing more than 70% of chloroformate units.

The yield was only about 50% and the polymerisation required cooling at 0° C.

80 mmols of vinyl chloroformate and 80 mmols of vinyl acetate were copolymerised in bulk, at 35° C., under nitrogen and in the presence of 0.4 mmol of DHPC. After one and a quarter hours, the reaction was stopped and a vinyl acetate/vinyl chloroformate copolymer having a molecular weight Mn=39,800 was collected with a yield of 92%.

This copolymer contained 46% of chloroformate units and 54% of acetate units.

Under the conditions of the process according to the invention, the reactivity of the vinyl chloroformate and the vinyl acetate are essentially identical, so that, by starting from a certain proportion of each of these monomers, it is possible easily to obtain a copolymer possessing chloroformate and acetate units in the same proportion. Copolymers containing a fraction of 0.5% to 50% of chloroformate units can thus be obtained. This "dilution" of the active units with an inexpensive monomer gives these copolymers great industrial value.

EXAMPLES 11 TO 15

Vinyl acetate (VA) and vinyl chloroformate (VCF) were copolymerised in solution in methylene chloride, at 35° C., in order to show how easily the invention makes it possible to vary the composition of a copolymer derived from vinyl chloroformate.

The conditions observed and the results obtained are shown in the following table:

| Example | $[VA]_o + [VCF]_o$ mols/liter[a] | Time hours | Yield % | Initial molar fraction of VA[b] | Composition of the copolymer (%)[c] | |
|---|---|---|---|---|---|---|
| | | | | | VA | VCF |
| 11 | 2.40 | 1 | 43.3 | 0.83 | 81 | 19 |
| 12 | 2.32 | 1 | 17.4 | 0.585 | 57 | 43 |
| 13 | 2.43 | 0.75 | 20.6 | 0.495 | 50 | 50 |
| 14 | 2.40 | 0.5 | 12.1 | 0.39 | 44 | 56 |
| 15 | 2.31 | 0.55 | 11.8 | 0.20 | 25 | 75 |

[a]Initial overall concentration of the monomers in the solution
[b]Initial molar fraction of vinyl acetate monomer
[c]Average of the value found by NMR and the value found by the chlorine content.

In each of the manipulations, 50 ml of $CH_2Cl_2$ and 0.5 mol% of DHPC initiator, relative to the monomers, were used.

EXAMPLE 16

55 mmols of vinyl chloroformate and 57 mmols of styrene were copolymerised in bulk, at 40° C., in vacuo and in the presence of 0.165 mmol of DHPC. A styrene/vinyl chloroformate copolymer having a molecular weight $\overline{M}n=14,000$ was obtained with a yield of 25%.

This copolymer contained 3% of chloroformate units and 97% of styrene units.

A copolymer of this type contains a very adequate number of reactive units and nevertheless has a low cost price on account of the proportion and the moderate price of the styrene.

EXAMPLE 17

118 mmols of vinyl chloride and 112 mmols of vinyl chloroformate were copolymerised in 50 ml of methylene chloride, at 35° C., in vacuo and in the presence of 2.3 mmols of DHPC (that is to say 1% of initiator, relative to the monomers).

After one hour, the reaction was stopped and a vinyl chloride/vinyl chloroformate copolymer, the composition of which was determined by NMR of the proton of the group

was obtained with a yield of 6%.

This composition is 75% of chloride to 25% of chloroformate, whereas the mixture initially contained 51.3% of vinyl chloride and 48.7% of vinyl chloroformate.

EXAMPLE 18

Vinyl chloroformate was polymerised in bulk, in the presence of 0.5 mol% of diisopropyl percarbonate. The polymerisation took place at 40° C. and lasted 24 hours.

When the 24 hours had elapsed, a coloured vinyl chloroformate homopolymer was obtained with a yield of 70%.

This polymer had a density of 1.40 and was soluble in acetone but not in chloroform.

If this manipulation is compared with Examples 1, 2, 6 and 7, it is seen that, in the case of the cycloaliphatic percarbonates, the reaction is much more rapid, the time-related yield is substantially better and the quality of the polymer is also better than in the case of the aliphatic percarbonates of which a typical representative was used here.

We claim:

1. A process for the synthesis of essentially colourless, transparent copolymers of vinyl chloroformate and a vinylic monomer capable of undergoing free radical polymerization, said copolymers having number average molecular weight of 8000–100,000, said vinylic monomer being a member selected from the group consisting of acrylonitrile, methyl methacrylate, styrene, vinyl chloride and vinyl acetate, which copolymer contains 0.5–50% of said chloroformate and 50–99.5% of said vinylic monomer, which consists of reacting a mixture of vinyl chloroformate and said vinylic monomer with an initiator, which is an aliphatic or cycloaliphatic percarbonate and wherein said percarbonate has the formula:

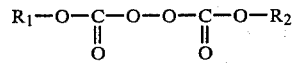

in which $R_1$ and $R_2$ are the same or different and are a linear or branched alkyl containing from 3 to 8 carbon atoms or cyclohexyl.

2. The process according to claim 1 wherein said reaction is carried out at a temperature of 15°–40° C. and in the presence of 0.04–1 mole % of said initiator.

3. Process according to claim 1 wherein said percarbonate is a dicyclohexyl percarbonate which is unsubstituted or substituted by one or two linear or branched alkyl groups containing from 1 to 4 carbon atoms.

4. Process according to claim 3 wherein said percarbonate is dicyclohexyl percarbonate.

5. Process according to claim 3 wherein said initiator is bis-(4-t-butylcyclohexyl) percarbonate.

6. The process according to claim 1 wherein said monomer is reacted with said initiator at a temperature between 0° and 50° C.

7. The process according to claim 1 wherein the amount of said initiator is 0.01–2 mole % relative to said monomer.

8. The process according to claim 1, wherein said reaction is carried out under an inert atmosphere.

9. The process according to claim 1, wherein said reaction is caried out in a solvent.

10. The process according to claim 9, wherein the solvent is a member selected from the group consisting of chlorinated aliphatic hydrocarbons, ethers free of peroxides and ketones.

11. An essentially colorless, transparent copolymer consisting essentially of vinyl chloroformate and a vinylic monomer which is a member selected from the group consisting of acrylonitrile, methyl methacrylat, styrene, vinyl chloride and vinyl acetate which contains 0.5–50% of said chloroformate and 50–99.5% of said vinylic monomer, of number average molecular weight of 8000–100,000 which is prepared by reacting vinyl chloroformate and said vinylic monomer in the presence of an initiator which is an aliphatic or cycloaliphatic percarbonate and wherein said percarbonate has the formula:

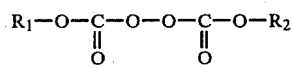

in which $R_1$ and $R_2$ are the same or different and are a linear or branched alkyl containing from 3 to 8 carbon atoms or cyclohexyl and isolating said copolymer from the reaction mixture.

12. Vinyl chloroformate/vinyl acetate copolymers according to claim 11, having a number average molecular weight of between 8000 and 50,000 and containing from 0.5 to 50% of chloroformate groups and 50 to 99.5% of acetate groups.

13. Vinyl chloroformate/styrene copolymers according to claim 11, having a number average molecular weight of between 8000 and 50,000 and containing from 1 to 10% of chloroformate groups.

14. Vinyl chloroformate/vinyl chloride copolymers according to claim 11, having a number average molecular weight of between 8000 and 100,000 and containing from 0.5 to 30% of chloroformate groups.

* * * * *